US 8,549,476 B2

(12) United States Patent
Shufer et al.

(10) Patent No.: US 8,549,476 B2
(45) Date of Patent: Oct. 1, 2013

(54) COMPARISON OF RESULT OF PROGRAM OPERATION TO RESULT OF AN OPERATION OF A DIFFERENT VERSION OF THE PROGRAM

(75) Inventors: Ilan Shufer, Tel Aviv (IL); Alexei Ledenev, Nes-Ziona (IL); Michael Kossowsky, Beit Shemesh (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 853 days.

(21) Appl. No.: 12/512,841

(22) Filed: Jul. 30, 2009

(65) Prior Publication Data

US 2011/0029957 A1   Feb. 3, 2011

(51) Int. Cl.
 *G06F 9/44* (2006.01)
(52) U.S. Cl.
 USPC ............................ 717/124; 717/131; 714/38.1
(58) Field of Classification Search
 USPC .................................................. 717/124, 127
 See application file for complete search history.

(56) References Cited

U.S. PATENT DOCUMENTS

| | | | |
|---|---|---|---|
| 5,630,049 A * | 5/1997 | Cardoza et al. ................. 714/25 |
| 6,360,332 B1 | 3/2002 | Weinberg et al. |
| 6,907,547 B2 | 6/2005 | Shaw et al. |
| 7,266,819 B2 | 9/2007 | Helgesen et al. |
| 7,299,451 B2 | 11/2007 | Dygon et al. |
| 8,112,165 B2 * | 2/2012 | Meyer et al. ..................... 700/87 |
| 8,121,709 B2 * | 2/2012 | Norberg et al. .................. 700/81 |
| 2003/0131285 A1 | 7/2003 | Beardsley et al. |
| 2003/0226138 A1 | 12/2003 | Luu |
| 2004/0015946 A1 | 1/2004 | Te'eni et al. |
| 2004/0034696 A1 * | 2/2004 | Joffrain et al. ................. 709/217 |
| 2004/0044993 A1 * | 3/2004 | Muller et al. .................. 717/124 |
| 2004/0177352 A1 | 9/2004 | Narayanaswamy et al. |
| 2005/0204343 A1 | 9/2005 | Kisamore et al. |
| 2007/0234293 A1 * | 10/2007 | Noller et al. ................... 717/124 |
| 2007/0240118 A1 * | 10/2007 | Keren ............................ 717/124 |
| 2008/0098272 A1 | 4/2008 | Fairbanks et al. |

OTHER PUBLICATIONS

Ledenev et al., International Search Report dated Feb. 17, 2009, PCT App. No. PCT/US08/65053, filed May 29, 2008.

* cited by examiner

*Primary Examiner* — Elias Mamo

(57) ABSTRACT

A system comprises a first computer on which a software program is executed. The software program causes an operation to be performed. The system also comprises a second computer coupled to the first computer and executes a different version of the software program. The second computer automatically duplicates the operation on the different version of the software program. An activity server is also coupled to the first and second computers to analyze a result of the operation on the first computer against a result of the operation on the second computer and to generate a notification when the result of the operation on the second computer is different.

17 Claims, 2 Drawing Sheets

US 8,549,476 B2

COMPARISON OF RESULT OF PROGRAM OPERATION TO RESULT OF AN OPERATION OF A DIFFERENT VERSION OF THE PROGRAM

BACKGROUND

Before a new version of a software application should be released to end-users for use, the new version of the software should be thoroughly tested to rid the software of any "bugs." Testing, unfortunately, can be labor and cost intensive.

BRIEF DESCRIPTION OF THE DRAWINGS

For a detailed description of illustrative embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the terms "couple," "couples," or "coupled" are intended to mean either logical, physical, indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be illustrative of that embodiment, and not intended to intimate that the scope of the disclosure, including the claims, is limited to that embodiment.

Figure 1:
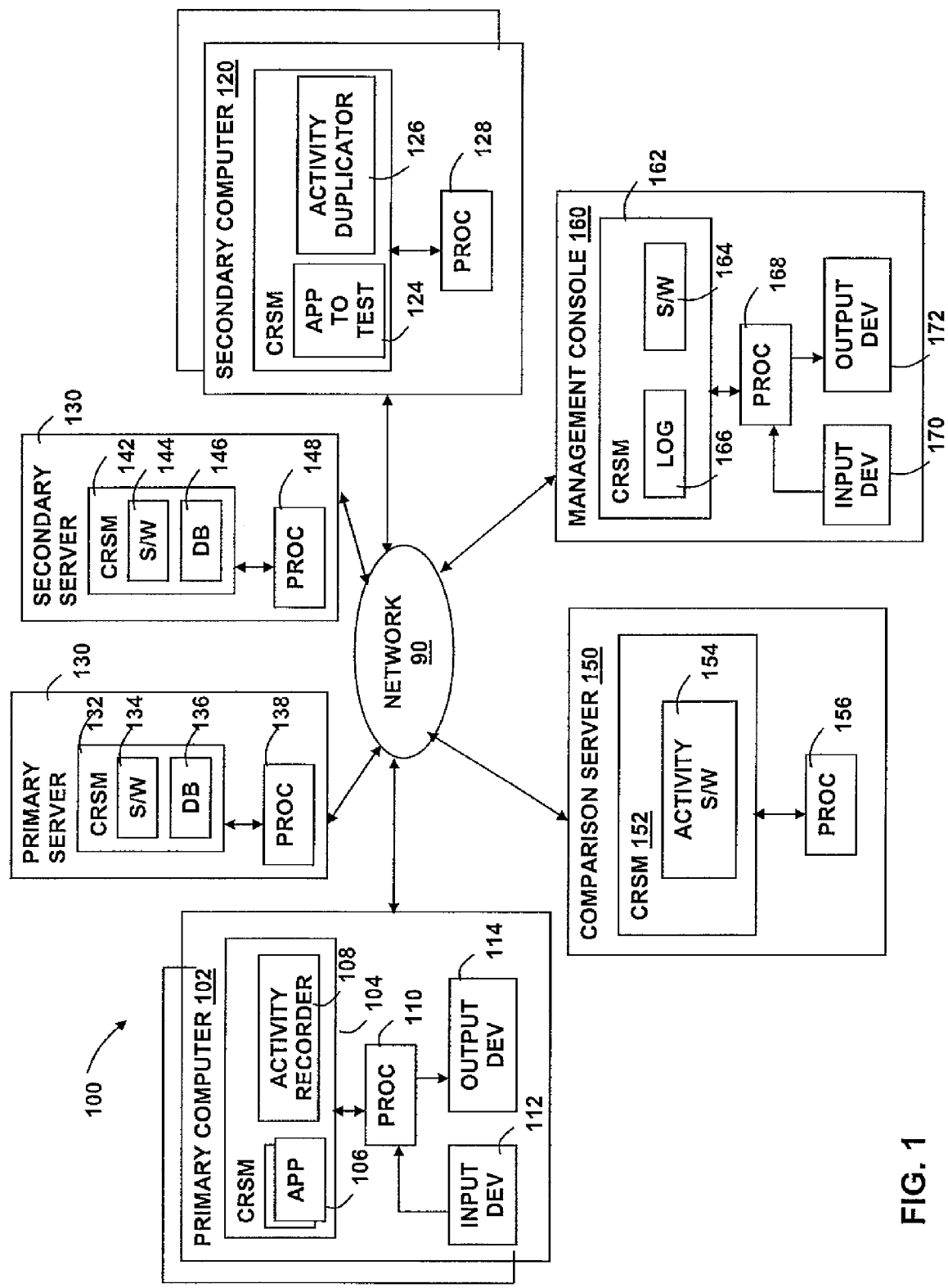
FIG. 1 shows a system in accordance with various embodiments.

FIG. 1 shows a system 100 comprising one or more primary computers 102 coupled to one or more secondary computers 120 via a network 90. Also shown are primary and secondary servers 130 and 140 as well as a comparison server 150 and a management console, all coupled to network 90. The terms "primary" and "secondary" simply differentiate one of computers 102 from another of computers 120 and do not impart any meaning as to the relative functionality of the computers. Each of the primary computers 102 comprises a computer-readable storage medium (CRSM) 104. The CRSM 104 comprises volatile storage (e.g., random access memory), non-volatile storage (e.g., read only memory, hard disk drive, compact disc read only memory (CD ROM), Flash memory, etc.), or combinations thereof. The CRSM 104 stores one or more applications 106 and an activity recorder 108.

Each primary computer 102 also comprises a processor 110 coupled to the CRSM 104 as well as to an input device 112 (e.g., keyboard, mouse, trackball, etc.) and an output device 114 (e.g., display, printer, etc.). The processor 110 executes the application(s) 106 and activity recorder 108. A user of primary computer 102 interacts with the computer via the input device 112, output device 114, and application(s) 106 to perform various tasks. The tasks are specific to the functionality of the application(s) 106. By way of an example, an application 106 may be part of an order system in which the user can enter orders from customers, bill the customers, etc. The application(s) 106 can perform any desired tasks.

In some embodiments, the activity recorder 108 comprises a software probe that monitors and records a user's interactions with application 106 executing on the primary computer 102. The activity recorder 108 records which selectable fields (e.g., buttons) the user selects with input device 112 (e.g., clicks with a mouse). The user may enter an alphanumeric value in a field. The activity recorder 108 records which field receives the alphanumeric value from the user and the alphanumeric value itself.

By way of example, a user of application 106 may create a new contact in a database (e.g., database 136 discussed below). Accordingly, the user would enter name, address, telephone numbers, email address and the like in corresponding fields. The activity recorder 108 records such input information as well as the fields in which the information was typed by the user thereby creating an association between the particular fields and the data entered therein. Further, the user may select a button that specifies that the new contact person is male and another button that specifies that the person uses the title "Mr." The activity recorder 108 records which buttons the user creating the new contact selected.

Referring still to FIG. 1, each secondary computer 120 comprises a CRSM 122 coupled to a processor 128. The CRSM 122 comprises volatile storage (e.g., random access memory), non-volatile storage (e.g., read only memory, hard disk drive, compact disc read only memory (CD ROM), Flash memory, etc.), or combinations thereof. The CRSM 122 of each secondary computer 120 comprises one or more applications-to-test (ATS) 124 and an activity duplicator 126, both of which are executed by a processor 128.

Each ATS 124 executing on a secondary computer 120 is a different version of a corresponding application 106 executing on a primary computer 102. In general, the functionality of each ATS 124 is much the same as the corresponding application 106. A different version of the application 106 might contain changes to the business logic or the user interface but not necessarily of all parts of the application. Accordingly, a change to one area of the application might impact, and negatively so, the functionality of another area of the application that was overlooked during the creation of the new version.

A goal of the disclosed system 100 is to test a new version of an application by comparing its execution against the current version of the application. That is, the operation of the ATS 124 is compared against the operation and result of its corresponding application 106. The testing process identifies any bugs in the new version so that those errors can be corrected before the new version is released for general use.

Accordingly, when a different version of a particular application 106 is ready for testing, an activity recorder 108 is installed on one or more primary computers 102 executing the current version of the application 106. In some embodiments, not all primary computers 102 executing the application 106 are installed with an activity recorder 108, but if desired, an activity recorder 108 can be installed on all such primary computers 102. In some embodiments, each computer 102 to execute an activity recorder 108 may already have the activity recorder 108 and only needs to enable, activate, and/or execute the activity recorder. For each primary computer 102 on which an activity recorder 108 is installed and activated to monitor and record the activity of an application 106, a corresponding secondary computer 120 is provided with an activity duplicator 126.

The activity recorder 108 for a given application 106 transmits its recorded application activity across network 90 to the activity duplicator 126 of the corresponding secondary computer 120. In some embodiments, the recorded application activity is transmitted in a peer-to-peer manner from primary computer 102 to secondary computer 120. In other embodiments, the recorded application activity is transmitted from the primary computer 102 to an intermediate server such as comparison server 150, and then from comparison server 150 to secondary computer 120.

The activity duplicator 126 receives the recorded application activity and automatically (i.e., without human intervention) replays that activity on an ATS 124. For example, if a user of application 106 selected a choice of options from a drop-down menu, information indicative of the selected option is transferred from activity recorder 108 to activity duplicator 126 and replayed on ATS 124 as if a human had actually selected the same choice on secondary computer 120. Accordingly, the user-interactions performed by a user interacting with application 106 on computer 102 are performed on the ATS 124 executing on computer 120. Because secondary computers 120 test different versions of applications and do so without requiring human intervention, the secondary computers 120 need not have a human-activated input device (e.g., keyboard, mouse, trackball, etc.) and need not have an output device (e.g., display), although secondary computers 120 can have such input and output devices. Thus, the duplication of the user interactions on ATS 124 is performed automatically, that is, without human interaction of computer 120.

Referring still to FIG. 1, the system 100 also comprises a primary server 130 and a secondary server 140 coupled to one or more or all of the primary and secondary computers 102, 120. The primary server 130 comprises a CRSM 132 coupled to a processor 138. The CRSM 132 of the primary server 130 comprises volatile storage (e.g., random access memory), non-volatile storage (e.g., read only memory, hard disk drive, compact disc read only memory (CD ROM), Flash memory, etc.), or combinations thereof. The CRSM 132 of the primary server 130 comprises software 134 and a database 136. The term "database" refers, for example, to a single file containing information or multiple-related files containing information. The software 134 is executed by the processor 138 and provides the primary server 130 with its functionality as described herein.

Each secondary server 140 also comprises a CRSM 142 coupled to a processor 148. The CRSM 142 of the secondary server 140 comprises volatile storage (e.g., random access memory), non-volatile storage (e.g., read only memory, hard disk drive, compact disc read only memory (CD ROM), Flash memory, etc.), or combinations thereof. The CRSM 142 of the secondary server 140 comprises software 144 and a database 146. The software 144 is executed by the processor 148 and provides the secondary server 140 with its functionality as described herein.

One or more of the applications 106 on the primary computers 102 access the database 136 of the primary server 130 for whatever information is needed for execution of the application 106. For example, the database 136 may contain customer demographic information such as names and addresses, and a user of an application 106 may want to send a purchased product to a particular customer. In this example, the application 106 retrieves the name and address of the relevant customer from the primary server's database 136. By way of another example, a user might enter a new customer (name, address, etc.) into the database 136 for use by that same user or a different user.

In accordance with various embodiments of the invention, the database 136 of the primary server 130 is duplicated on the secondary server 140 so that ATS's 124 executing on one or more of the secondary computers 120 can access the same database accessed by applications 106. Duplication of the database 136 may occur before testing of the ATS's 124 begins and may occur by copying the database 136 and transmitting the copy across network 90 to the secondary server 140 and storing the copy as shown at 146 (referred to herein as copy 146 of database 136).

Following duplication, as users of applications 106 enter new information or otherwise change existing information (e.g., modify or delete) in database 136, such changes of information in database 136 may not be duplicated in the copy 146 of the database on the secondary server 140. Consequently, following the initial database duplication, the contents of the database 136 on the primary server 130 may become different from the contents of the initially duplicate copy 146 of the database. Accordingly, it may be advantageous to resynchronize the copy 146 of the database to the primary server's database 136. Database resynchronization may be performed, for example, by copying the database 136 to the secondary server and replacing the current copy 146 with the new copy of the database. Database resynchronization may occur periodically (e.g., once per hour, every 5 hours, 4 times per day, etc.), manually (upon command by a user of the management console 160, or both (periodically but a user can force a database resynchronization as desired. If desired, the entire database 136 can be copied, but in other embodiments only a subset is copied to the copy 146.

The comparison server 150 comprises a CRSM 152 coupled to a processor 156. The CRSM 152 comprises volatile storage (e.g., random access memory), non-volatile storage (e.g., read only memory, hard disk drive, compact disc read only memory (CD ROM), Flash memory, etc.), or combinations thereof. The CRSM 152 comprises comparison software 154 that communicates with each of the primary computers 102 and corresponding secondary computers 120 to receive the recorded activities of computers 102 and 120 and also a data structure from computers 102, 120 indicative of information generated for viewing by the computers 102, 120. Such data structure may include user interface items such as buttons, text, location of user interface controls and output values that provide, for example, messages indicative of a completion of a process or an output representing a computation. The comparison software 154 compares the data structures representing what is generated for viewing by the computers 102, 120. In accordance with at least some embodiments, the comparison software 154 comprises Hewlett-Packard's Quick Test Professional software which records and replays user operations for the purpose of testing, creates a data structure representing a user interface, and records activities of a user and replay the activities, for example at a later time, for testing and for validating expected results.

Any differences in operation and results between the application 106 and its corresponding ATS 124 as determined by the comparison software 154 are provided to management console 160. Management console 160 comprises a processor 168 coupled to CRSM 162, an input device 170, and an output device 172. The CRSM 162 comprises volatile storage (e.g., random access memory), non-volatile storage (e.g., read only memory, hard disk drive, compact disc read only memory (CD ROM), Flash memory, etc.), or combinations thereof. The input device 170 comprises one or more of a keyboard, mouse, trackball, and the like. The output device 172 comprises one or more of a display or printer. The CRSM 162 comprises software 164 and a log 166. The software 164 is executed by processor 168 to provide the management console 160 with the functionality described herein.

In accordance with at least some embodiments, the environments in which the application 106 executes and in which the corresponding ATS 124 executes are the same. That is, the operating system under which the application and the ATS 124 execute is the same on both computers 102 and 120 and the language is the same (e.g., English, French, etc.), and any other characteristics of an operating environment are the same. By maintaining identical operating environments in at least some embodiments, any differences in operation of the ATS 124 relative to its corresponding application are presumably attributed to the ATS 124 itself.

Any differences in operation between the application 106 and its corresponding ATS 124 are stored in log 166 and/or shown on output device 172 of the management console 160. A user of the management console 160 can view of the differences by way of graphical user interface (GUI). In accordance with at least some embodiments, the following features can be viewed or caused to occur on the output device 172 of the management console 160:

(1) alerts on differences between an ATS 124 and a corresponding application 102;

(2) the states of the computers 102 and 120 at the time that the differences were determined;

(3) the differences themselves between the computers 102 and 120 at the time the differences were determined;

(4) the ability to view the state of the user interfaces, and in comparison, present on each computer 102, 120 back a pre-programmed or user-specified number of user interface steps before the time at which the difference was discovered;

(5) once a difference between the operations of an application 106 and ATS 124 has been determined, the ability to "always ignore" that particular difference;

(6) the ability to disable the pairing of a primary computer 102 and a corresponding secondary computer 120 and thus to cease recording and duplicating;

(7) the ability to enable a new pairing of a primary computer 102 and a corresponding secondary computer 120 and to being recording and duplicating; and (8) data replacement—when duplicating data, if a user of application 106 enters a particular value, always duplicate with a different value on secondary computer 120.

A user of management console 160 can respond to any observed differences in operation between the application 106 and corresponding ATS 124. For example, the management console user can communicate with the user of the primary computer 102 on which the application 106 executes for clarification. The user of the management console 160 also may report the differences, which may indicate a bug in the ATS 124, to a programmer to fix the problem.

As explained above, the ATS 124 is a different version of the corresponding applicant 106. Because of differences between the application 106 and the corresponding ATS 124, the state of the ATS 124 may become out of synch with respect to the state of the corresponding application 106. For example, a user of application 106 may select an option from a drop-down menu and the application may respond by performing an activity associated with the selected option. The same option selected on the ATS 124, however, may cause a window to be generated in which the user would have to click an "OK" (or equivalent) button to authorize the ATS 124 to perform the same action. Thus, while application 106 performs the selected option without further user authorization, ATS 124 requires, in this example, user authorization to perform the selected option. As such, the state of the ATS 124 will remain frozen waiting for the requisite user authorization.

By way of an additional example, a duplication of creation of, for example, an order may fail because the shipping address chosen from a list was not duplicated to database copy 146 of the secondary server 140. The duplication to computer 120 may fail because the shipping address did not exist in database copy 146. Thus, to complete the business process, a user of the management console 160 either manually inserts the shipping address into database copy 146, or instead chooses a different address from the list. In the latter case (selection of a different address altogether) may result in the need to ignore that difference later on via a user's interaction with the management console 160.

To address these issues and as alluded to above, the user of the management console 160 manually can force the state of the ATS 124 to be re-aligned with the state of its corresponding application 106. Re-alignment may include the management console user clicking the "OK" button in the example above so that the ATS 124 can resume operation. The management console 160 can access the secondary computer 120 experiencing a difference in ATS operation relative to the corresponding application 106. Via network 90, the management console can establish a remote connection to a specified secondary computer 120 and, on output device 172, display whatever information the specified secondary computer 120 generates to be displayed. Using input device 170, a user of the management console 170 can control the activities of the secondary computer 120 to which the management console 170 is operatively coupled, for example, to re-align the ATS 124 on the selected secondary computer 120 to the application 106 on the corresponding primary computer 102.

Re-alignment also may include entering data in the copy 146 of the database so that the ATS 124 will be able to use the same data used by the application 106 which accesses database 136.

Figure 2:
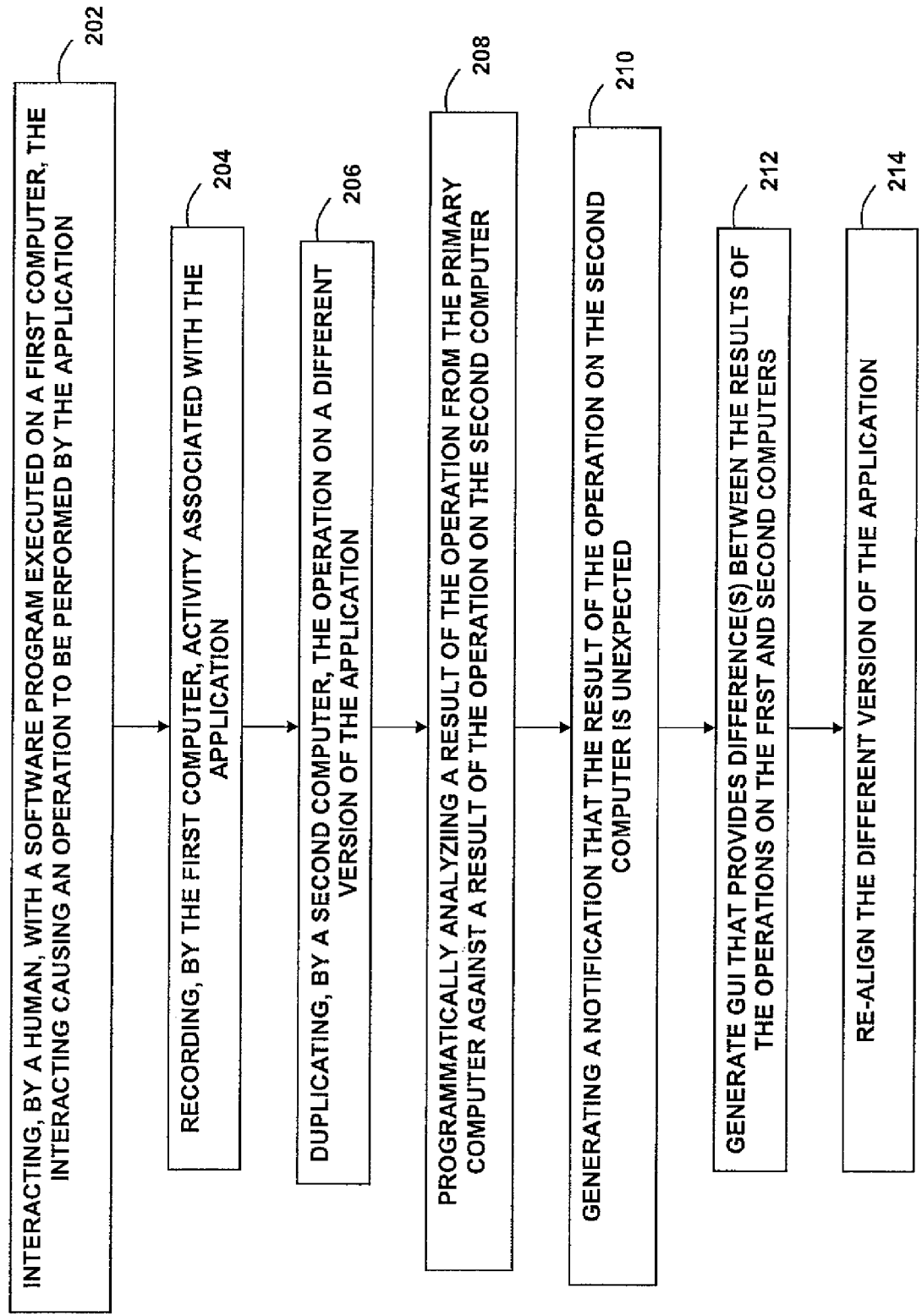
FIG. 2 shows a method in accordance with various embodiments.

FIG. 2 shows a method in accordance with an illustrative embodiment. The steps shown in FIG. 2 can be performed in an order that is different from that shown in FIG. 2. Some steps may be performed concurrently as appropriate and as desired. At 202, the method comprises interacting, by a human with a software application 106 executing on a first computer (e.g., primary computer 102. This interaction causes an operation to be performed by the application 106. At 204, the activity associated with the application 106 is recorded by the first computer, for example, by activity recorder 108. At 206, a second computer (e.g., secondary computer 120) duplicates the recorded operation on a different version of the application, for example, via activity recorder 126.

Referring still to FIG. 2, the method further comprises programmatically analyzing a result of the operation from the first computer against a result of the operation on the second computer (e.g., using comparison server 150). If a difference is observed, a notification is generated (210) that the result of the operation of the ATS 124 on the second computer is unexpected (i.e., different than the operation on the first computer). At 212, a GUI is generated to provide the difference(s) between the results of the operations on the first and second computers. As noted above, the ATS 124 on a secondary computer can be re-aligned (214) to its corresponding application 106.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
    a first computer on which a software program is executed, said software program causing an operation to be performed, the first computer comprising an activity recorder to record user-created activities associated with the software program;
    a second computer coupled to the first computer and executing a different version of the software program, said second computer comprising an activity duplicator to receive from the first computer messages comprising the recorded user-created activities originating from the first computer and to automatically implement the recorded activities in the different version of the software program executed on the second computer to duplicate the operations performed by the first computer's software program;
    a comparison server coupled to the first and second computers that analyzes a result of the operation on the first computer against a result of the operation on the second computer and generates a notification when the result of the operation on the second computer is different from the result of the operation on the first computer.

2. The system of claim 1 wherein the software program comprises logic and wherein said different version of the software program comprises some, but not all, of the same logic.

3. The system of claim 1 further comprising a management console coupled to said comparison server and said second computer, said management console causing a state of said different version of the software program on the second computer to re-align with a state of the software program on the first computer.

4. The system of claim 3 wherein said management console generates a graphical user interface that provides differences between the results of the first and second computers.

5. The system of claim 1 further comprising a primary server coupled to said first computer, said comparison server, and said management console, and comprising a secondary server coupled to said second computer, said comparison server, and said management console, wherein said management console causes a database on the primary server to be synchronized to a copy of the database on the secondary server.

6. A computer-implemented method, comprising:
    interacting, by a human, with a software application executed on a first computer, the interacting causes an operation to be performed on the software application;
    the operation on the first computer causing duplicating, by a second computer, the operation on the different version of the software application executed on the second computer coupled to the first computer, the duplicating on the second computer occurring without a human;
    programmatically analyzing a result of the operation on the first computer against a result of the operation on the second computer; and
    generating a notification, by way of the first computer, when the result of the operation on the second computer is unexpected.

7. The method of claim 6 wherein the software application comprises logic and wherein said different version of the software application comprises some, but not all, of the same logic.

8. The method of claim 6 further comprising recording, by the first computer, activity associated with said software application.

9. The method of claim 6 further causing a state of the different version of the software application on the second computer to re-align with a state of the software application on the first computer.

10. The method of claim 9 further comprising generating a graphical user interface that provides information indicative of differences between the results of the first and second computers.

11. The method of claim 6 wherein duplicating the operation comprises causing user-interactions performed by a user on the first computer to be performed on the different version of the software.

12. A computer-readable storage medium (CRSM) containing software that, when executed by one or more processors, causes the one or more processors to:
    observe an interaction of a human with a software application executed on a first computer, the interaction causing an operation to be performed by the software application;
    send a representation of the interaction to a second computer on which a different version of said software application executes;
    implement said interaction on said second computer to cause the second computer to perform a corresponding operation;
    determine a first result of the interaction between the human and the software application;
    determine a second result of the corresponding operation performed on the second computer; and
    generate a notification upon said first and second results being different.

13. The CRSM of claim 12 wherein said software further causes the one or more processors to compare said first and second results.

14. The CRSM of claim 13 wherein said software causes the one or more processors to generate a graphical user interface that provides information indicative of differences between the first and second results.

15. The CRSM of claim 12 wherein said software causes the one or more processors to re-align a state of the different version of said software application with a state of the software application executing on the first computer.

16. The CRSM of claim 12 wherein said software causes a database to be copied from a first server accessible by said first computer to a second server accessible by said second computer, and wherein the software causes the one or more processors to receive input from a human to provide data for use by said different version of said software to thereby cause thereby cause a state of the software application and a state of the different version of said software application to be the same.

17. The CRSM of claim 12 wherein the software application comprises logic and wherein said different version of the software application comprises some, but not all, of the same logic.

\* \* \* \* \*

UNITED STATES PATENT AND TRADEMARK OFFICE
CERTIFICATE OF CORRECTION

| | | |
|---|---|---|
| PATENT NO. | : 8,549,476 B2 | Page 1 of 1 |
| APPLICATION NO. | : 12/512841 | |
| DATED | : October 1, 2013 | |
| INVENTOR(S) | : Ilan Shufer et al. | |

It is certified that error appears in the above-identified patent and that said Letters Patent is hereby corrected as shown below:

In the Claims

In column 7, line 64, in Claim 6, delete "on the" and insert -- on a --, therefor.

In column 8, line 65, in Claim 16, delete "thereby cause a state" and insert -- a state --, therefor.

Signed and Sealed this
First Day of April, 2014

Michelle K. Lee
*Deputy Director of the United States Patent and Trademark Office*